Oct. 23, 1951  P. J. STEPHENS  2,572,778
BOAT LOADING AND UNLOADING DEVICE
Filed Feb. 3, 1947  2 SHEETS—SHEET 1

Inventor
Peter J. Stephens

By *Clarence A. O'Brien and Harvey B. Jacobson*
Attorneys

Oct. 23, 1951  P. J. STEPHENS  2,572,778
BOAT LOADING AND UNLOADING DEVICE
Filed Feb. 3, 1947  2 SHEETS—SHEET 2

Inventor
Peter J. Stephens

By *Clarence A. O'Brien and Harvey B. Jacobson*
Attorneys

Patented Oct. 23, 1951

2,572,778

UNITED STATES PATENT OFFICE 2,572,778

BOAT LOADING AND UNLOADING DEVICE

Peter J. Stephens, Detroit, Mich.

Application February 3, 1947, Serial No. 726,093

2 Claims. (Cl. 214—38)

The present invention relates to new and useful improvements in boat loading and unloading devices and more particularly to a device of this character for loading the boat onto and unloading them from the top of an automobile or other vehicle.

An important object of the present invention is to provide a device of this character by means of which a boat may be loaded onto and unloaded from an automobile by a single person without undue effort and without danger of damaging or marring the finish of the top of the automobile.

A further object of the invention is to provide a device of this character which is entirely separate from the automobile and not in any way attached thereto so that no alterations or changes in the construction of the automobile is necessary.

A still further object is to provide a device of this character constructed of collapsible elements whereby the same may be easily and conveniently carried in the automobile while transporting the boat or unloading the same therefrom.

A still further object of the invention is to provide a device of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
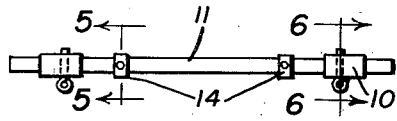
Figure 1 is a top plan view of the loading and unloading frame.
Figure 2:
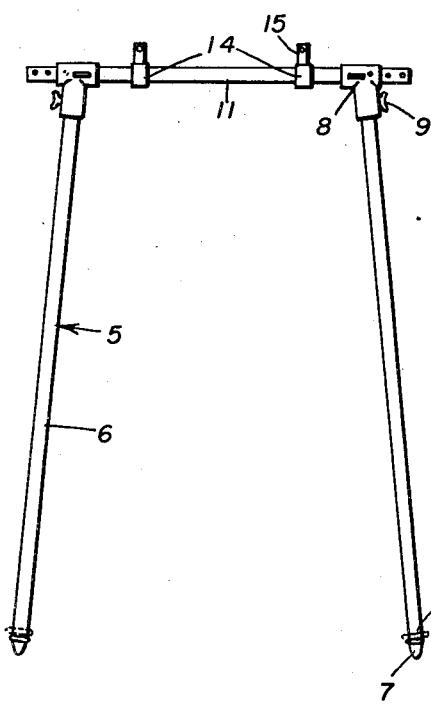
Figure 2 is a front elevational view thereof.
Figure 5:
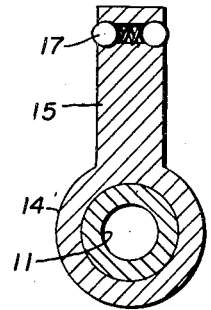
Figure 5 is an enlarged transverse sectional view of one of the oar socket engaging pins taken substantially on a line 5—5 of Figure 1.
Figure 3:
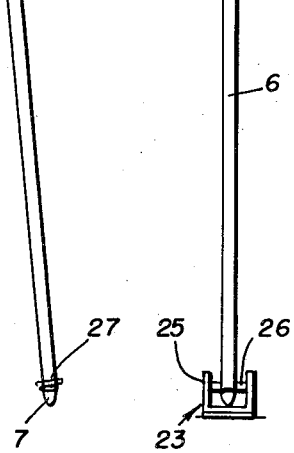
Figure 3 is a side elevational view.
Figure 6:
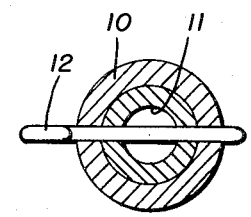
Figure 6 is a sectional view taken on a line 6—6 of Figure 1.
Figure 7:
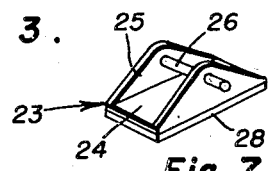
Figure 7 is a perspective view of one of the detachable teeth pivotally supporting the lower end of the leg.
Figure 4:
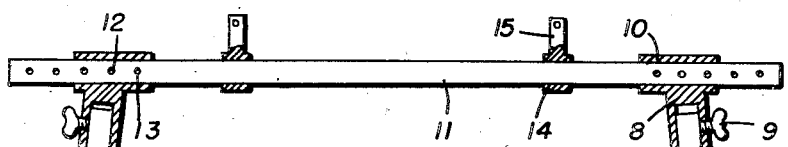
Figure 4 is an enlarged front elevational view with parts broken away and shown in section.
Figure 8:
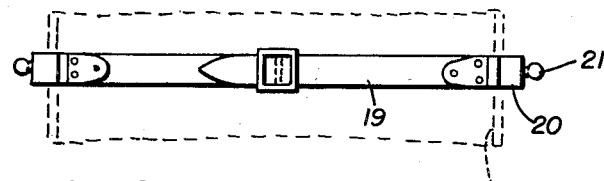
Figure 8 is a top plan view of one of the supporting straps for the boat.
Figures 9, 10:
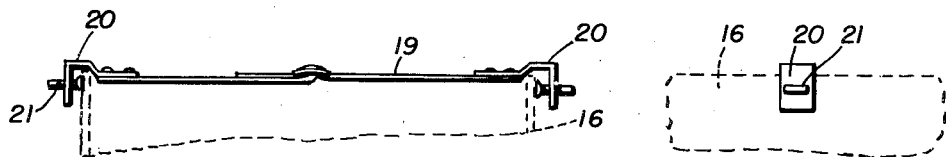
Figure 9 is a side elevational view thereof.
Figure 10 is an end elevational view of one of the clamps for the strap.
Figure 11:
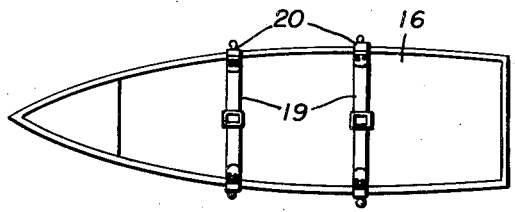
Figure 11 is a top plan view of the boat showing the supporting straps in position thereon.

Referring now to the drawings in detail wherein for the purpose of illustration I have disclosed a preferred embodiment of the invention the numeral 5 designates the loading and unloading frame generally and which comprises a pair of legs 6 adapted for positioning at the opposite sides of an automobile, the legs having lower pointed ends 7 to bite into the surface of the ground and prevent slipping of the legs thereon.

To the upper end of each leg 6 is attached a socket 8 by means of a set screw 9, the socket being of substantially T-shaped formation and including a horizontal tubular cross head 10 in which the ends of a cross bar 11 are received and secured in adjusted position in the socket by means of pins 12 selectively received in longitudinally spaced openings 13 in the cross bar whereby to adjust the legs 6 toward or away from each other in accordance with the width of the automobile with which the frame is used.

A pair of collars 14 are slidably mounted on the cross bar 11, each of the collars having a pin 15 projecting radially therefrom and adapted for insertion in a conventional oar lock socket (not shown) of a row boat 16. The outer end of the pin 15 is provided with spring projected balls 17 positioned at diametrically opposite sides of the pin to releasably lock the pin in the oar lock socket.

Figure 12:
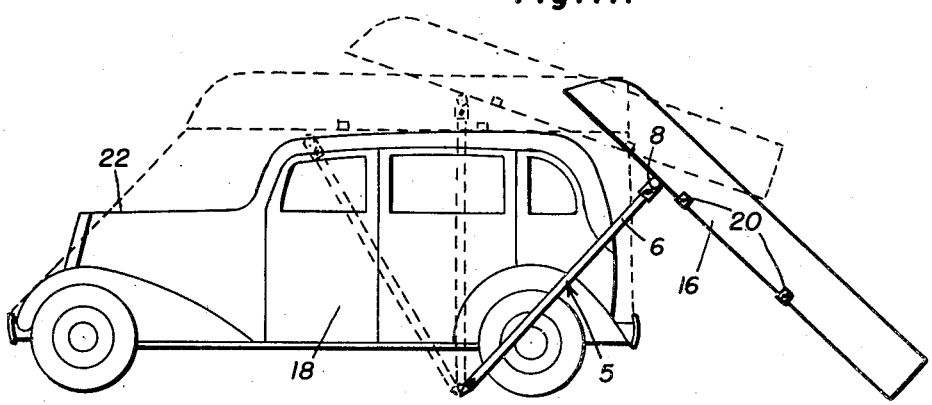
Figure 12 is a side elevational view showing the boat in position for mounting onto the top of an automobile.

In the operation of the device the legs 6 are positioned at the opposite sides of an automobile 18 with the pins 15 inserted in the oar lock socket adjacent the bow end of an inverted row boat 16 as shown by the full lines in Figure 12 of the drawings, the legs being arranged to prop the bow end of the boat in a raised position. The automobile 18 is then backed under the bow end of the boat between the legs 6 and the stern of the boat is then lifted and the boat swung forwardly on the legs 6 past the vertical center line of the legs and the boat gently lowered onto the top as shown by the left-hand dotted line.

In order to prevent injury to the top of the automobile a pair of adjustable straps 19 are positioned transversely of the sides of the boat, the ends of the straps having angle iron clamps 20 secured thereto projecting downwardly at the outer sides of the boat and provided with clamping screws 21 for clamping the clamps tightly to the opposite sides of the boat with the straps 19 drawn taut. The straps 19 thus support the boat in its inverted position on the top of the automobile.

The bow and stern of the boat are tied to the front and rear bumpers of the automobile by ropes 22, and the boat may then be safely transported without danger of falling from the automobile.

When it is desired to load or unload the boat from a hard surface, the lower ends of the legs 6 are attached to a foot 23 constructed with a flat base 24 having upwardly extending spaced apart flanges 25 through which a pin 26 is inserted, the legs having transverse openings 27 for pivotally mounting on the pins. The underside of the base 24 is provided with an anti-slipping pad 28.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A boat loading and unloading device for a vehicle comprising a pair of legs positionable on opposite sides of a vehicle, feet having anti-slip pads pivoted to the lower ends of said legs and adapted to grip the ground adjacent the vehicle, a cross bar, means for adjustably securing said cross bar to the upper ends of said legs, and collars slidably mounted on said cross bar each having a projecting pin adapted for insertion in an oar lock socket of a boat.

2. The combination of claim 1 wherein said means includes substantially T-shaped sockets secured upon the upper ends of said legs, each of said sockets including a horizontal crosshead slidably receiving said cross bar, said cross bar including longitudinally spaced apertures, and a pin extending through said crosshead and selectively received in said apertures.

PETER J. STEPHENS.

REFERENCES CITED

The following references are of record in the file of this patent:

UNITED STATES PATENTS

| Number | Name | Date |
|---|---|---|
| 1,132,859 | Kohl | Mar. 23, 1915 |
| 1,345,216 | Norbett | June 29, 1920 |
| 2,180,032 | Casley | Nov. 14, 1939 |
| 2,392,008 | Squires | Jan. 1, 1946 |
| 2,486,316 | Morse et al. | Oct. 25, 1949 |